phone
UNITED STATES PATENT OFFICE.

EDWARD J. DE SMEDT, OF WASHINGTON, DISTRICT OF COLUMBIA.

ART OF MANUFACTURING PORTLAND CEMENT.

SPECIFICATION forming part of Letters Patent No. 274,288, dated March 20, 1883.

Application filed December 20, 1882. (No specimens.)

*To all whom it may concern:*

Be it known that I, EDWARD J. DE SMEDT, of Washington city, in the District of Columbia, have invented a certain new and useful Improvement in the Art of Manufacturing Portland Cement, of which the following is a specification.

In order that my invention may be more readily understood, I will first set out the usual methods of manufacturing Portland cement, and the disadvantages attending them, and will then describe my improvement on the same.

Portland cement is a compound of argillo-calcareous or argillo-magnesian substances, and may be made from natural rocks or earths wherein are found by analysis the necessary proportion of silica, alumina, and lime or magnesia, or from a combination or mixture of lime with clay of various kinds. It is usually made in two ways, known as the "wet" or "English" process and the "dry" or "German" process.

1. *The wet process.*—In this process, the proper proportion of clay and chalk, having been collected, are thrown into a pug-mill or into a mill with chasers, and water is added; the mixture is constantly stirred, and the chasers reduce the "mix" to an almost impalpable powder, causing perfect admixture. The mix is then allowed to flow out in a paste of about the consistency of cream onto drying-floors heated by steam for the purpose of expelling the excess of water by artificial heat, or into "backs" or vats in the open air about two feet deep, where by evaporation and decantation all the water is drawn out. In this process the paste thus formed is cut, when dry, into bricks or squares about a foot to two feet square, and carried to the kilns. When placed in the kilns many of the pieces lose their corners and much of the dry material is scaled off by reason of the intense heat, and this powder thus formed, owing to its not being properly calcined and to its becoming mixed with the dust of the ashes, is wasted. The square form or squared sides of the bricks prevent draft, owing to their many points of contact. When drawn from the kilns the material is in the form of clinker in masses as large as a man's head, and in most cases covered with an unpenetrable vitrifaction or glaze, which is injurious to the manufacture of cement and makes the grinding very difficult. The clinker drawn from the kilns is carefully examined, all vitrified pieces thrown out, the under-burned portion put in again, and the good clinker broken up in breakers, and then ground and packed in barrels ready for market.

2. *The dry process.*—In this process, the chalk and clay, having been dried and powdered, are mixed together in a dry mixer in a dry state, and are then run into a pug-mill, where just enough water is added to make a stiff paste. The material, as it exudes from the pug-mill, is cut into bricks, loaded onto cars, and carried to a drying-room, when in about a week or two weeks' time it is ready to be carried to the kiln. It is then burned, as in the other process before described, ground, and barreled. The same disadvantages of burning apply to this dry process as have been described as applying to the wet process.

*Disadvantages of the wet system.*—This system has the following disadvantages: *a*, the immense storage-room required for the wet paste; *b*, the repeated handling required; *c*, the irregularity of the manufactured article, the paste run out on the backs being composed of materials of different specific gravities, the heavier naturally settling to the bottom; *d*, the large capital required to carry the stock of paste in the backs, the material requiring from two to four months to dry.

*Disadvantages of the dry system.*—*a*, it requires one more handling and one more grinding than the wet; *b*, the large expense for drying-floors; *c*, the large expense for fuel required in the drying operation.

*Disadvantages incident to both systems.*—First, the handling of the material from the mixers to drying-floors or "backs" and then back to kilns; second, the waste of time and money before the mixed material can be used; third, the loss by wastage in the kilns, as before described; fourth, the added difficulty of grinding the glazed clinker; fifth, the extra amount of coal required to send heat through the cold or only partly-warmed masses of dried paste. It will be noticed that most, if not all, of these disadvantages are due directly or indirectly to the preliminary drying operation, which is performed before the calcining operation can take place.

Ordinary paste formed into bricks or other forms, if subjected, in the moist state, to a great heat, will fly apart and will all scale off into powder, leaving nothing behind, and consequently proper calcination is impossible. This effect is due to the sudden evaporation of the water contained in the bricks or pieces. The water, in its course toward evaporation, encountering an obstacle, (the coating formed on the outside of the brick,) breaks it in order to escape. This scaling off goes on continually until the whole piece is reduced to powder. Thus it is that recourse is had to the method now in use of thoroughly drying the paste before calcining it—a process of great length and most expensive. The problem to determine is how to produce bricks or pieces in a moist state of a sufficient porosity to allow the water of evaporation to escape during the calcining operation without breaking the bricks into pieces or dust. I have discovered that this result can be obtained by mixing a combustible (by preference a hydrocarbon) with the argillo-calcareous or argillo-magnesian material prior to the calcining operation, and it is this feature that characterizes my invention. I prefer to use a hydrocarbon combustible, and among the hydrocarbons I prefer coal-tar, petroleum-oil, or petroleum-residuum. I do not, however, restrict myself to hydrocarbons, but contemplate the use of any combustible—for instance, sawdust, should the material be of such character as to require an addition of potash. Preferably I use about five parts, by weight, of the combustible to one hundred parts of the dry powder from which the paste is made; but I do not confine myself to this percentage, for the proportions may be considerably varied without departure from my invention. In practice I find it more convenient and better on the whole to mix the combustible with the dry powder, and then to mix this mass with water sufficient to make a thick paste. The mixing can be effected in any suitable known way and by the aid of ordinary mixing apparatus. I have, however, mixed the combustible, the powder, and the water together at one and the same time with equally good results. Under some circumstances it may be advisable to mix the powder and the combustible in heated state; but as a general rule this will not be found necessary. The paste thus produced is made up in the usual way into bricks or other forms, which, in their moist state, are put into the kiln and subjected to the calcining operation. They can be taken at once from the mill or place where they are formed and put into the kiln, no delay being necessary—in fact, the sooner they are put into the kiln the better. During the calcining operation the combustible contained in the brick burns out gradually, and the brick is thus rendered porous little by little, according to the penetration of the combustion. The steam or vapor has thus afforded to it a free passage from the brick, and the latter preserves its form and shape unimpaired throughout the process of calcination. There is a noticeable absence of the surface glaze or vitrifaction which usually appears on the calcined brick under ordinary methods, and, besides this, the calcination is more uniform and regular by reason of the introduction throughout the brick of a heat-giving combustible. The bricks or forms, after calcination, are ground, and the product is packed in barrels in the usual way.

My invention possesses the following advantages over the methods of manufacture heretofore practiced. As compared with the wet system, it does away with the backs or vats and the necessity for acres of storage-room. It lessens the amount of handling required, because it permits the paste to be run directly from the mixers to the kilns. It prevents the irregularity in the paste which results in the wet system from the settling of the heavier portions, and it lessens the outlay of capital required to carry the paste for months before it is ready for use. As compared with the dry process, it reduces the ordinary handling about one-third. It does away with drying-floors, and it also does away with all the expense for fuel now required to dry the paste. As compared with both systems, it reduces the time required for manufacture from months in the wet system and weeks in the dry system to two or three days. It reduces to the minimum all loss by wastage and powdering in the kilns. It reduces cost of grinding, owing to the absence of the usual surface glaze or vitrifaction on the brick. It reduces the amount of fuel required to calcine the bricks, and it insures a regular and uniform product.

I state, in conclusion, that my invention is applicable generally to all hydraulic cements in which the material is reduced to the condition of a paste before calcination, and I desire to be understood as embracing this application in my claims.

Having described my invention, what I claim, and desire to secure by Letters Patent, is as follows:

1. The improvement in the art of manufacturing Portland cement which consists in adding to and mixing with the cement material a hydrocarbon or other combustible prior to the calcining operation, substantially as and for the purpose hereinbefore set forth.

2. The improvement in the art of manufacturing Portland cement which consists in mixing with the paste from which the cement is to be made a combustible, then making up this compound into bricks or other suitable forms, and then subjecting the same, while still moist, to the process of calcination, substantially as hereinbefore set forth.

3. A cement-paste composed of hydraulic-cement-making materials in combination with a combustible material, substantially as hereinbefore set forth.

In testimony whereof I have hereunto set my hand this 19th day of December, 1882.

E. J. DE SMEDT.

Witnesses:
 EWELL A. DICK,
 J. WALTER BLANDFORD.